United States Patent
Chelikani et al.

(10) Patent No.: US 10,315,484 B2
(45) Date of Patent: Jun. 11, 2019

(54) VEHICLE TWIST AXLE ASSEMBLY

(71) Applicants: Abhinand Chelikani, Troy, MI (US); Kevin Richard Langworthy, Davisburg, MI (US); Sukhdeep Singh, Bakersfield, CA (US)

(72) Inventors: Abhinand Chelikani, Troy, MI (US); Kevin Richard Langworthy, Davisburg, MI (US); Sukhdeep Singh, Bakersfield, CA (US)

(73) Assignee: MAGNA INTERNATIONAL INC., Aurora (CA)

( * ) Notice: Subject to any disclaimer, the term of this patent is extended or adjusted under 35 U.S.C. 154(b) by 14 days.

(21) Appl. No.: 15/516,649

(22) PCT Filed: Oct. 13, 2015

(86) PCT No.: PCT/US2015/055293
§ 371 (c)(1),
(2) Date: Apr. 3, 2017

(87) PCT Pub. No.: WO2016/061078
PCT Pub. Date: Apr. 21, 2016

(65) Prior Publication Data
US 2018/0229575 A1  Aug. 16, 2018

Related U.S. Application Data

(60) Provisional application No. 62/063,533, filed on Oct. 14, 2014.

(51) Int. Cl.
*B23P 15/00* (2006.01)
*B60G 21/05* (2006.01)

(52) U.S. Cl.
CPC ............ *B60G 21/052* (2013.01); *B23P 15/00* (2013.01); *B60G 21/051* (2013.01);
(Continued)

(58) Field of Classification Search
CPC .............. B60G 21/052; B60G 2200/21; B60G 2206/20; B60G 2206/8102; B23P 15/00; B23P 2700/14
See application file for complete search history.

(56) References Cited

U.S. PATENT DOCUMENTS 6,086,162 A * 7/2000 Pinch ..................... B60G 3/145
228/185
6,708,994 B2 * 3/2004 Etzold .................... B60G 7/001
280/124.106
(Continued)

FOREIGN PATENT DOCUMENTS

WO      2013185217 A1    12/2013

*Primary Examiner* — Faye M Fleming
(74) *Attorney, Agent, or Firm* — Dickinson Wright PLLC

(57) ABSTRACT

The twist axle assembly includes a pair of spaced apart trailing arms and a twist beam which is made of a single piece and is operably connected with the trailing arms. The twist beam has a top wall, a bottom wall and a pair of side walls. The twist beam presents a pair of end portions which are bent to present edges that face towards one another when viewed in cross-section, and the twist beam presents a middle portion which extends between the end portions. The middle portion has an opening with a generally elliptical shape formed into the bottom wall for reducing a torsion stiffness of the middle portion of the twist beam in comparison to the end portions.

16 Claims, 19 Drawing Sheets

(52) U.S. Cl.
CPC ...... *B23P 2700/14* (2013.01); *B60G 2200/20* (2013.01); *B60G 2200/21* (2013.01); *B60G 2206/20* (2013.01); *B60G 2206/8102* (2013.01)

(56) References Cited

U.S. PATENT DOCUMENTS

| | | | |
|---|---|---|---|
| 7,967,308 B2* | 6/2011 | Toepker | B21D 53/88 |
| | | | 280/124.106 |
| 8,585,067 B2 | 11/2013 | Zhang et al. | |
| 8,870,204 B2* | 10/2014 | Buschjohann | B60G 21/051 |
| | | | 280/124.128 |
| 9,180,749 B2* | 11/2015 | Baumer | B60G 11/189 |
| 2009/0033142 A1* | 2/2009 | Bitz | B60B 35/007 |
| | | | 301/127 |
| 2011/0219602 A1 | 9/2011 | Toepker | |
| 2013/0093156 A1 | 4/2013 | Buschjohann et al. | |
| 2014/0151973 A1 | 6/2014 | Baumer et al. | |
| 2018/0029434 A1* | 2/2018 | Chelikani | B60G 21/051 |

* cited by examiner

VEHICLE TWIST AXLE ASSEMBLY

CROSS REFERENCE TO RELATED APPLICATION

This U.S. National Stage Patent Application claims the benefit of PCT International Patent Application Ser. No. PCT/US2015/055293 filed Oct. 13, 2015 entitled "Vehicle Twist Axle Assembly," which claims the benefit of and priority to U.S. Provisional Patent Application Ser. No. 62/063,533 filed Oct. 14, 2014, the entire disclosures of the applications being considered part of the disclosure of this application, and hereby incorporated by reference.

BACKGROUND OF THE INVENTION

1. Field of the Invention

The present invention is related, generally, to vehicle twist axle assemblies.

2. Related Art

A twist beam rear axle suspension assembly, also known as a torsion beam axle, is a type of automobile suspension system including a pair of trailing arms, each of which is coupled with a wheel of a vehicle, and a twist beam which extends transversely between the trailing arms. During operation of the vehicle, the twist beam deforms in a twisting movement when one of the wheels moves relative to another, such as during vehicle body roll or when one of the wheels encounters, for example, a pothole or an obstacle in a road. The twisting movement of the twist beam absorbs this movement to make the ride more comfortable for occupants in the vehicle body.

In general, it is desirable to provide the twist beam with a pair of regions with a relatively increased stiffness at the ends of the twist beam and a relatively reduced stiffness in the longitudinal middle region of the twist beam. One approach to providing the twist beam with a middle region of reduced stiffness and end regions of increased stiffness is to form the twist beam of a tube and crush the tube into a U or V shape in the middle region. However, this process may be difficult to implement and may require one or more post-shaping heat treating operations which increase the cost of the resulting twist beam. Another approach is to stamp the twist beam to its shape and then to weld brackets to the longitudinal ends. Under this approach, the welded brackets provide the increased stiffness in the end portions.

SUMMARY OF THE INVENTION AND ADVANTAGES

One aspect of the present invention provides for a twist axle assembly for a vehicle. The twist axle assembly includes a pair of spaced apart trailing arms and a twist beam which is made of a single piece and is operably connected with the trailing arms. The twist beam has a top wall, a bottom wall and a pair of side walls. The twist beam presents a pair of end portions which are bent to present edges that face towards one another when viewed in cross-section, and the twist beam presents a middle portion which extends between the end portions. The middle portion has an opening with a generally elliptical shape formed into the bottom wall for reducing a torsion stiffness of the middle portion of the twist beam in comparison to the end portions.

The twist beam assembly is advantageous because it may be shaped cost effectively through stamping and because, in use, the reduced torsional stiffness of the middle portion absorbs the majority of the deflection between the trailing arms, thereby protecting the connections between the end portions and the trailing arms from damage that could result from twisting in the end portions.

According to another aspect of the present invention, the opening of the middle portion extends onto at least one of the side walls.

According to yet another aspect of the present invention, the edges end portions contact one another such that the end portions have closed geometric profiles.

According to still another aspect of the present invention, the edges of the end portions are spaced from one another by a gap.

According to another aspect of the present invention, a longitudinal midpoint of the twist beam has a first width and the end portions have a second width that is greater than the first width and the middle portion between the longitudinal midpoint and the end portions has a third width which is greater than the second width.

According to yet another aspect of the present invention, the twist beam has a generally constant width between the end portions.

According to still another aspect of the present invention, at one bracket attaches each end portion of the twist beam and the associated one of the trailing arms.

According to another aspect of the present invention, the end portions of the twist beam are directly welded to the trailing arms.

According to yet another aspect of the present invention, the side walls of the middle portion are provided with openings to further reduce the torsional stiffness of the middle portion.

A further aspect of the present invention is a method of making a twist axle assembly. The method includes the step of providing a pair of trailing arms. The method proceeds with the step of stamping a workpiece into a twist beam. The twist beam has a top wall, a bottom wall, a pair of side walls, a pair of end portions and a middle portion that extends between the end portions. The end portions are bent to present edges that face one another when viewed in cross-section, and the middle portion has an opening with a generally elliptical shape formed into the bottom wall for reducing torsional stiffness in the middle portion as compared to the end portions. The method proceeds with the step of attaching the end portions of the twist beam with the trailing arms.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a first exemplary embodiment of a twist axle assembly 20 for a vehicle suspension system is generally shown in FIGS. 1-6. The twist axle assembly 20 includes a pair of longitudinally spaced trailing arms 22 and a twist beam 24 which extends transversely between and is attached with the trailing arms 22. The twist beam 24 is a stamped beam design in that it is shaped to its final geometry through one or more stamping operations. The twist beam 24 is preferably made of steel or a steel alloy. However, it should be appreciated that other materials may be employed.

Figure 3:
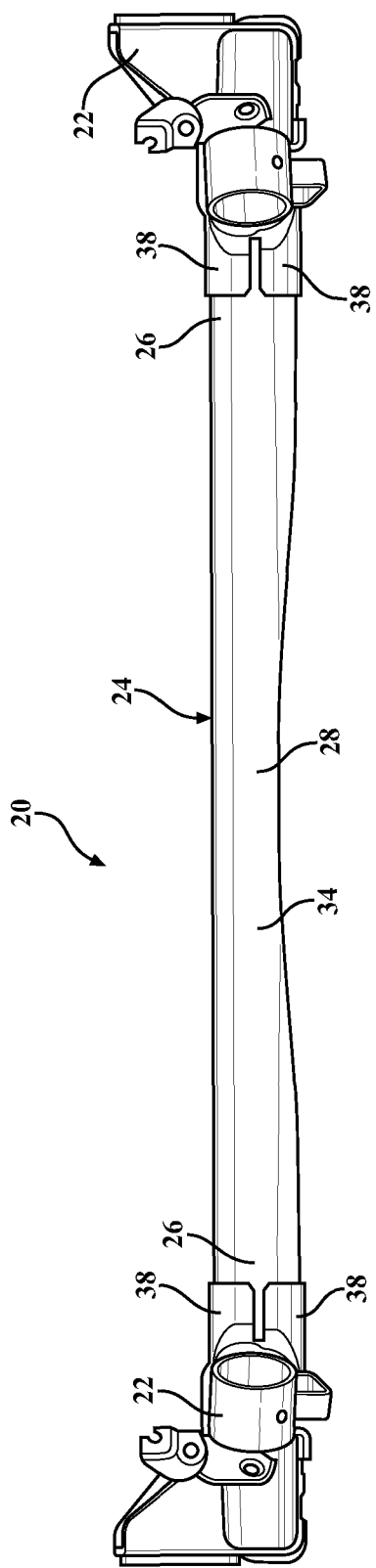
FIG. 3 is a front elevation view of the twist axle assembly of FIG. 1.
Figure 4:
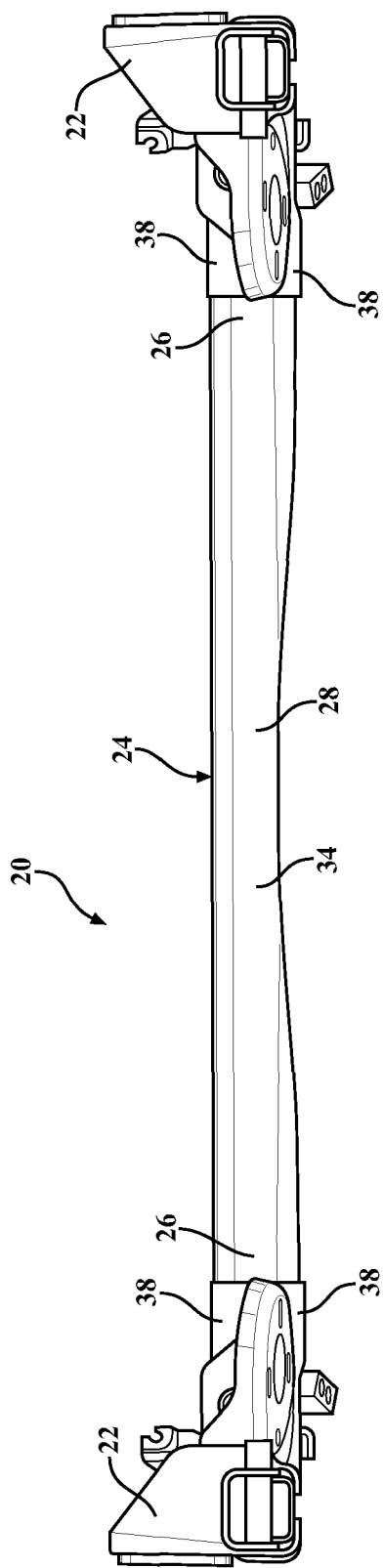
FIG. 4 is a back elevation view of the twist axle assembly of FIG. 1.
Figure 5:
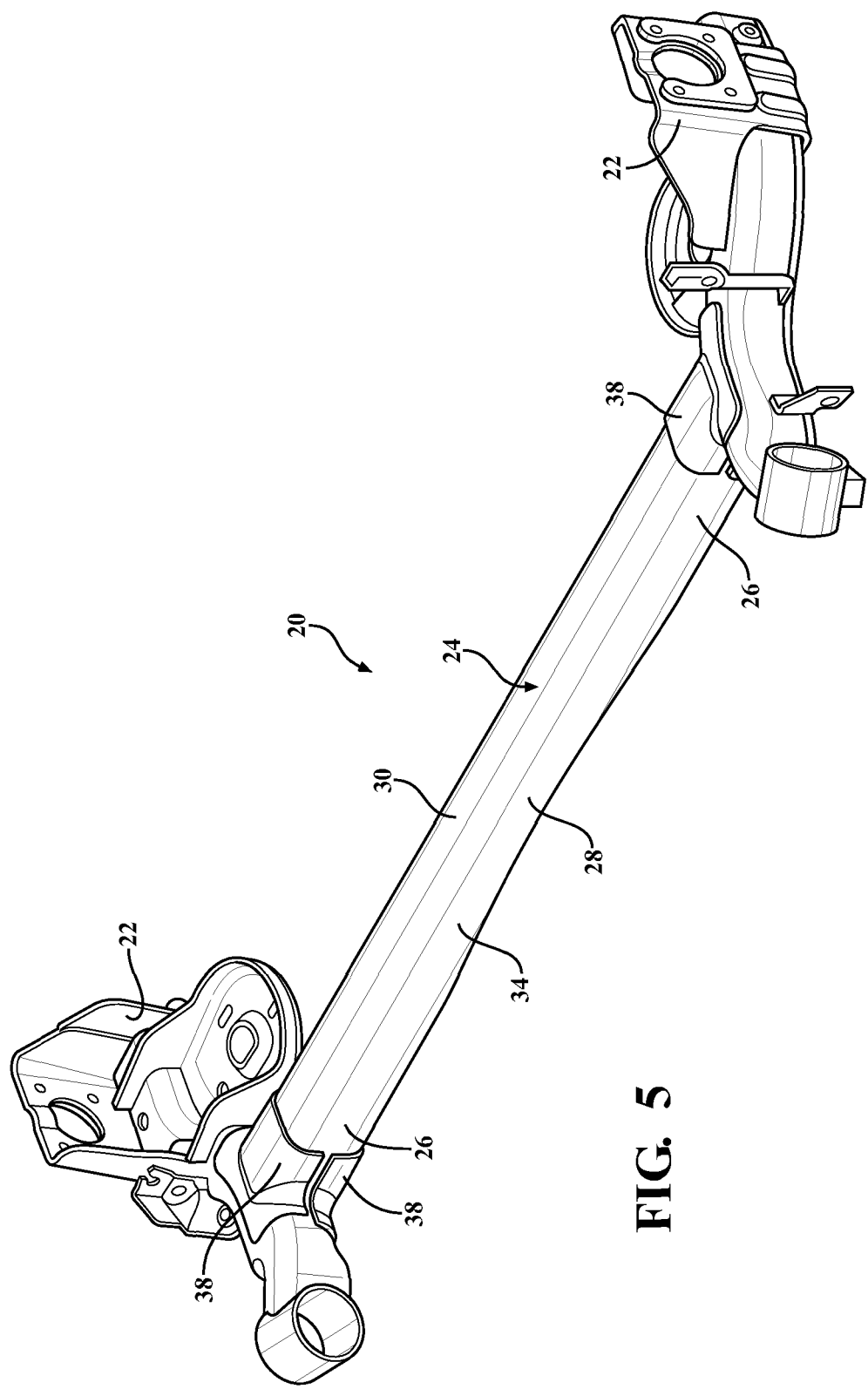
FIG. 5 is a perspective view of the twist axle assembly of FIG. 1.
Figure 6:
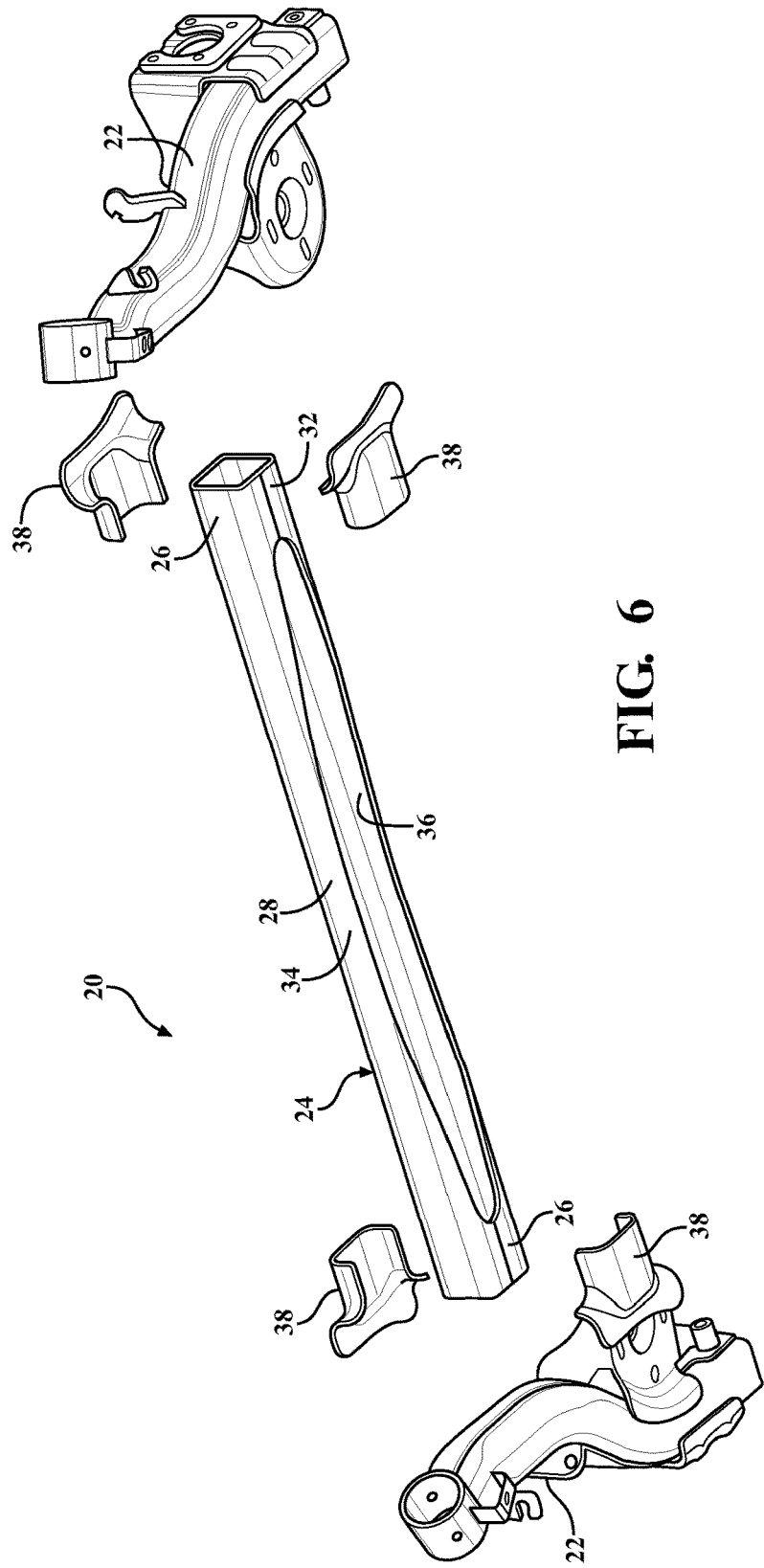
FIG. 6 is an exploded view of the twist axle assembly of FIG. 1.
Figure 7:
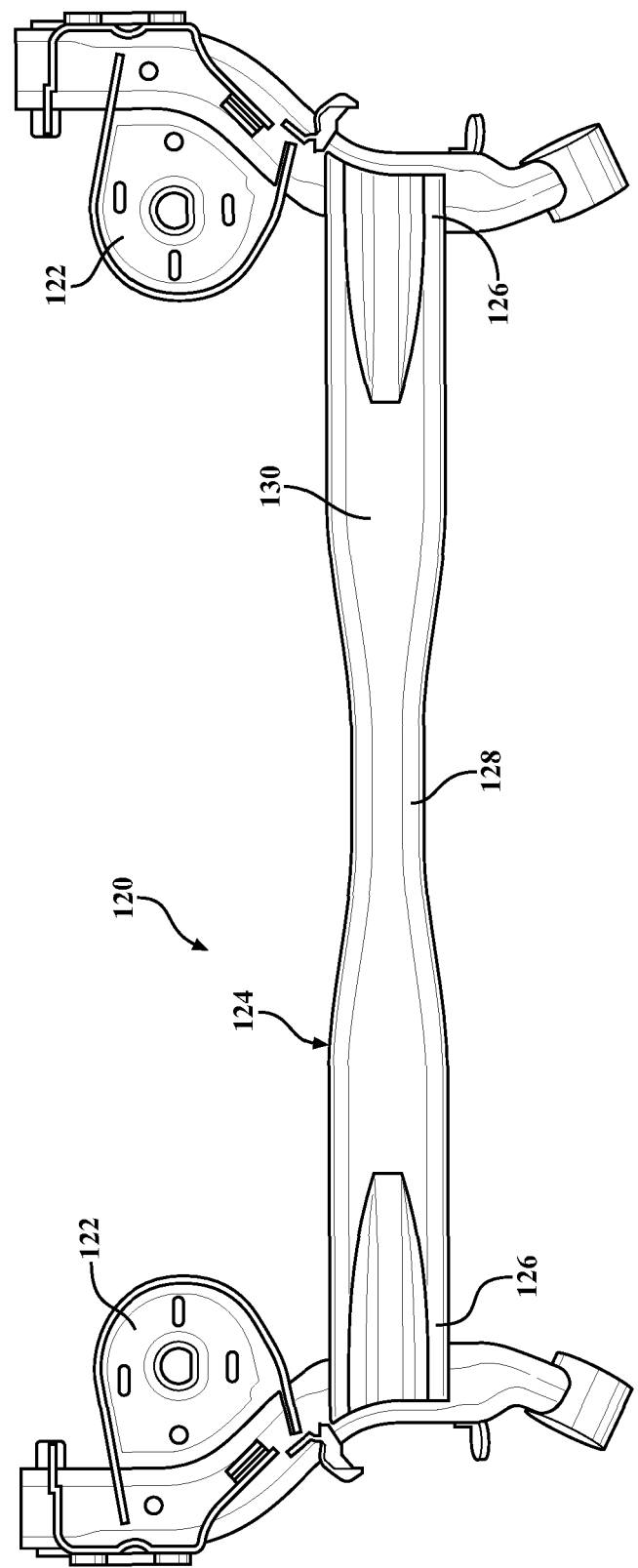
FIG. 7 is a top elevation view of a second exemplary embodiment of the twist axle assembly.
Figure 8:
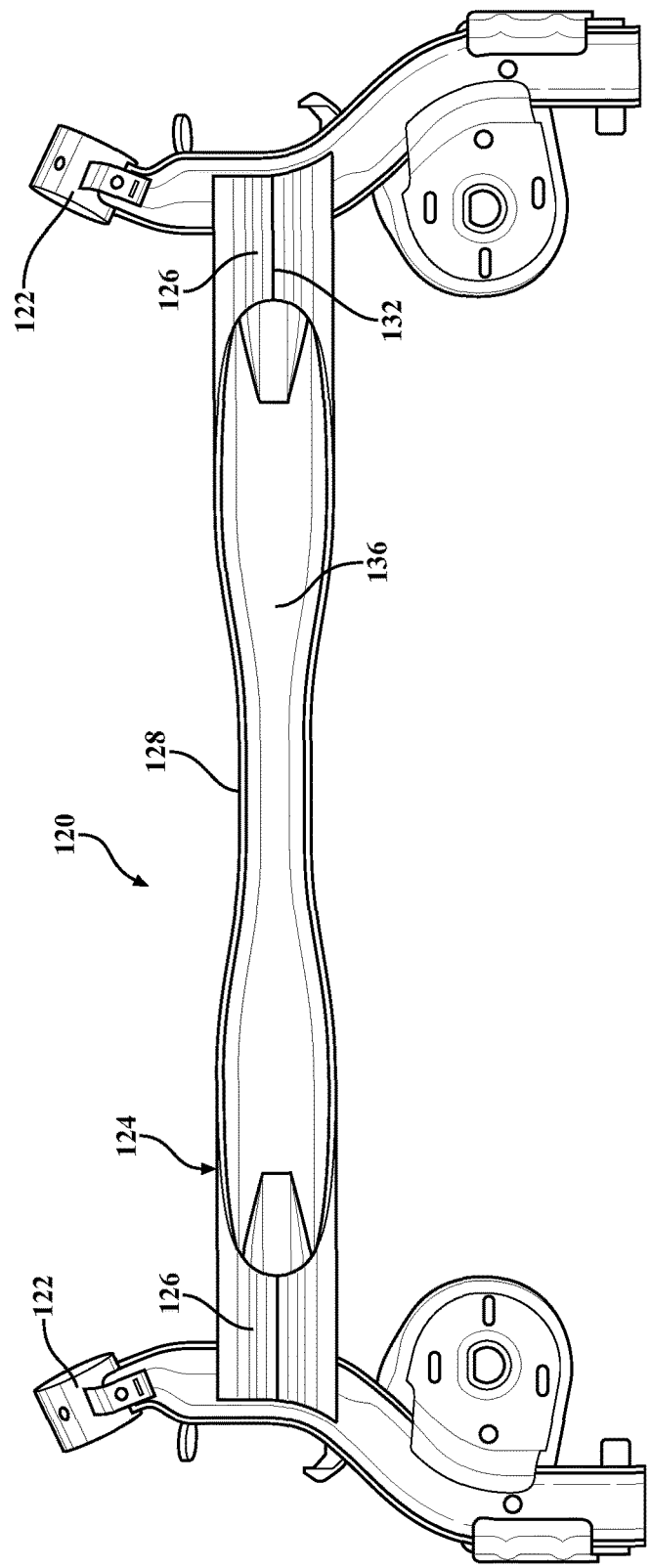
FIG. 8 is a bottom elevation view of the twist axle assembly of FIG. 7.

As shown in FIGS. 3 and 6, the exemplary twist beam 24 includes a pair of longitudinal end portions 26 which are spaced longitudinally from one another by a middle portion 28. As viewed in cross-section, the end portions 26 of the twist beam 24 have a closed geometrical profile in the shape of a rectangle with rounded corners. This shape is achieved by folding or bending the edges of the plate inwardly so that the edges face and contact one another to define the closed geometrical profile and to present a top wall 30, a bottom wall 32 and a pair of side walls 34 which extend transversely between the top and bottom walls 30, 32. In the exemplary embodiment, the folding or bending processes to give the end portions 26 the rectangular shape as viewed in cross-section are performed during the stamping operations. Due to the rectangular cross-sectional shape of the end portions 26, these end portions 26 have a very high torsional stiffness for providing a very strong connection with the trailing arms 22.

Figure 1:
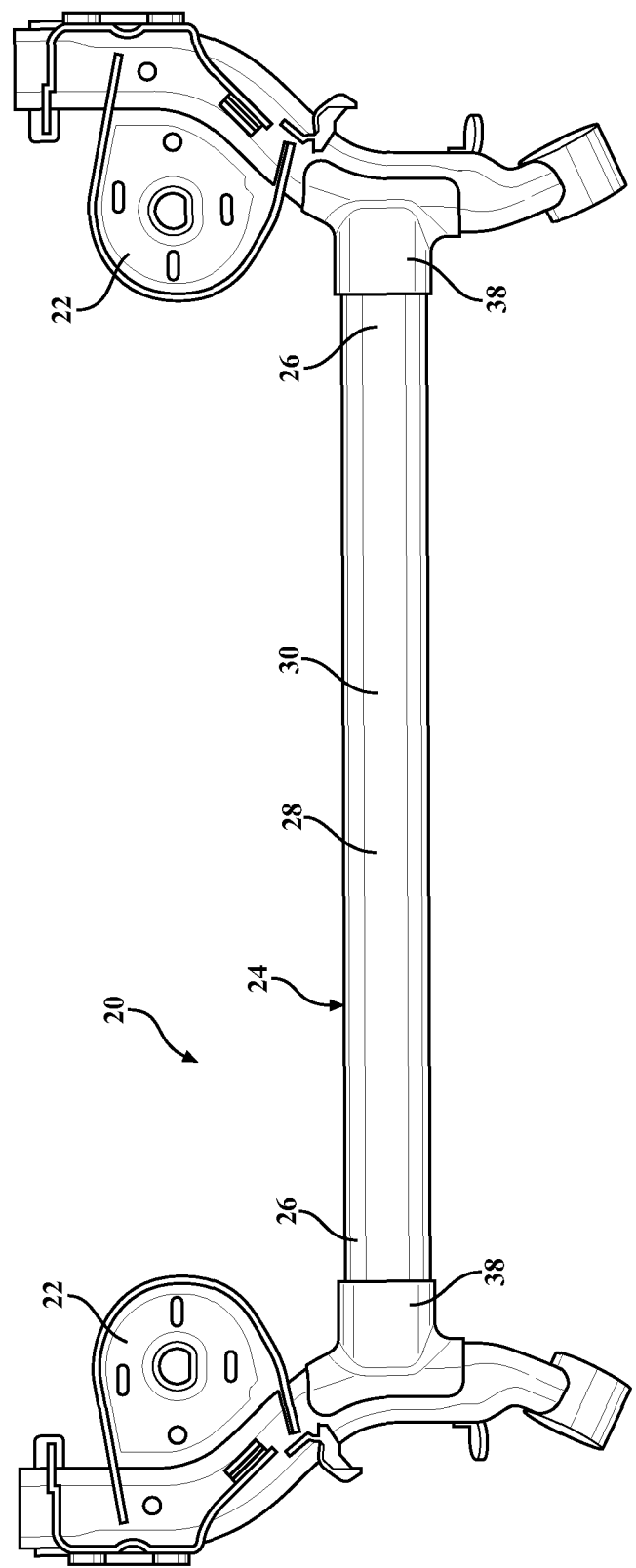
FIG. 1 is a top elevation view of a first exemplary embodiment of the twist axle assembly.
Figure 2:
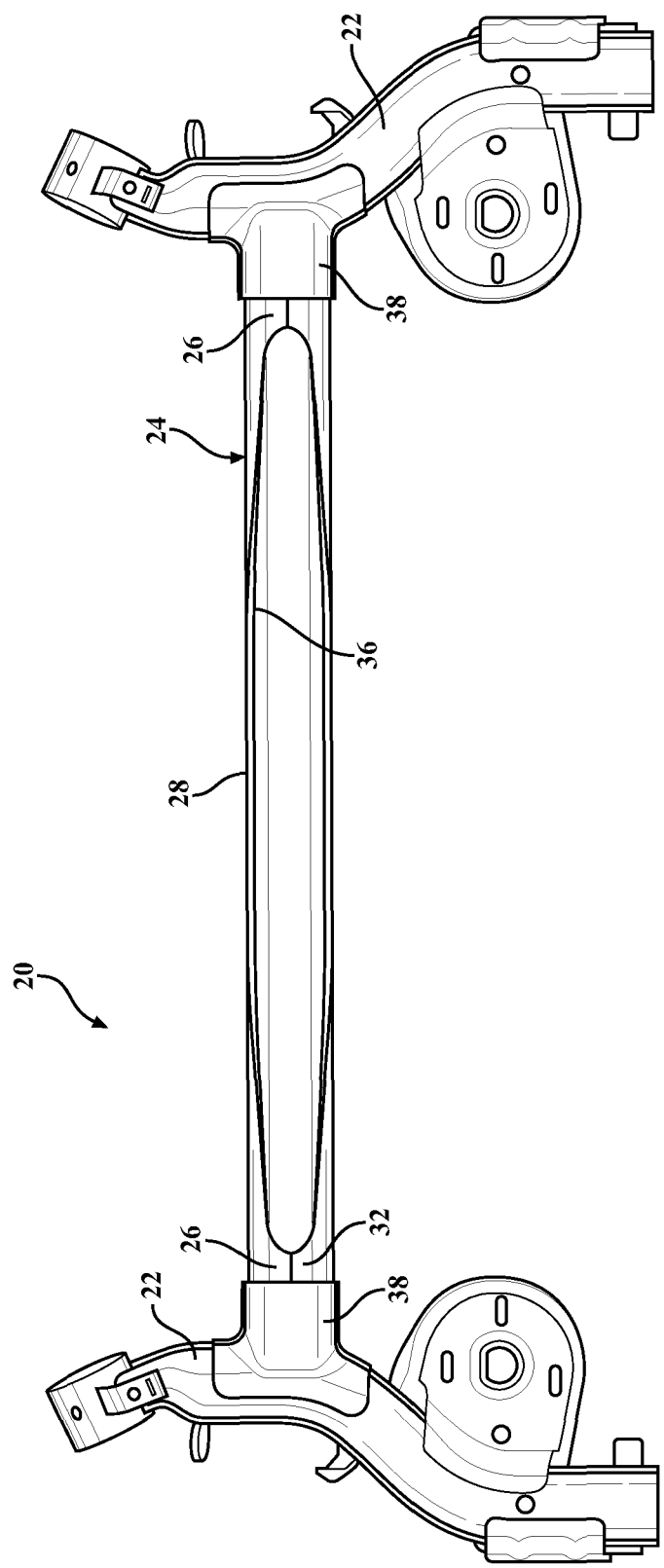
FIG. 2 is a bottom elevation view of the twist axle assembly of FIG. 1.

As shown in FIGS. 2 and 6, the middle portion 28 of the exemplary twist beam 24 presents an opening 36 which extends longitudinally for providing the middle portion 28 with relatively lower torsional stiffness as compared to the end portions 26. Specifically, the opening 36 extends longitudinally along the bottom wall 32 of the twist beam 24 such that the middle portion 28, unlike the end portions 26, has an open geometrical profile when viewed in cross-section. The exemplary opening 36 is generally elliptical or oval in shape with its long dimension extending longitudinally and its widest point being located at an approximate longitudinal midpoint of the middle portion 28 between the end portions 26. At its widest point, the opening 36 extends laterally from the bottom wall 32 and at least partially into the opposite side walls 34 of the twist beam 24. As such, at the longitudinal midpoint of the twist beam 24, the twist beam 24 is generally U-shaped when viewed in cross-section and transitions to a C-shape towards the end portions 26 and then to a full rectangular shape at the end portions 26.

The open geometrical shape provides the middle portion 28 of the twist beam 24 with a reduced torsional stiffness as compared to the end portions 26, which have a closed rectangular geometrical shape. Further, the elliptical shape of the opening 36 has the effect of gradually increasing the torsional stiffness of the twist beam 24 from the widest point of the opening 36 towards the end portions 26 because the cross-sectional profile becomes more and more closed towards the longitudinal ends of the elliptically shaped opening 36. In other words, the longitudinal mid-point of the twist beam 24, which corresponds with the widest area of the opening 36, has the lowest torsional stiffness, and the torsional stiffness of the twist beam 24 gradually increases from the longitudinal mid-point towards the end portions 26. This is advantageous because, during use, the majority of the flexing of the twist beam 24 occurs in the middle portion 26 which protects the connections between the twist beam 24 and the trailing arms 22 from damage.

Referring now to FIG. 6, the first exemplary embodiment of the twist axle assembly 20 further includes a pair of brackets 38 which are mated with the outside surfaces of the twist beam 20 at each of the end portions 26 of the twist beam 24. The brackets 38 extend outwardly from the ends of the twist beam 24 and are shaped to engage with a portion of the trailing arm 22. Specifically, the exemplary brackets 38 are configured to engage the trailing arm 22 with a so-called "glove" style connection wherein one bracket 38 engages a top surface of the trailing arm 22 and the other bracket 38 engages a bottom surface of the trailing arm 22 and each bracket engages the inner and/or the outer surface of the respective trailing arm 22. The brackets 38 may be attached to the twist beam 24 and to the trailing arm 22 through, for example, welding.

Referring now to FIGS. 7-12, a second exemplary embodiment of the twist axle assembly 120 is generally shown with like numerals, separated by a factor of 100, indicating corresponding parts with the first exemplary embodiment described above. The second exemplary embodiment is similar to the first exemplary embodiment described above in that the twist beam 124 is also of a stamped beam design. However, the twist beam 124 of the second exemplary embodiment is distinguished from the first exemplary embodiment described above in that the side walls 134 of twist beam 124 are curved such that they are laterally closer to one another at the longitudinal midpoint of the twist beam 124 than at the end portions 126. In other words, the width of the twist beam 124 at the longitudinal center is less than at the end portions 126. This further decreases the torsional stiffness of the twist beam 124 in the middle portion 128 as compared to the middle portion 28 of the first exemplary embodiment.

Figure 9:
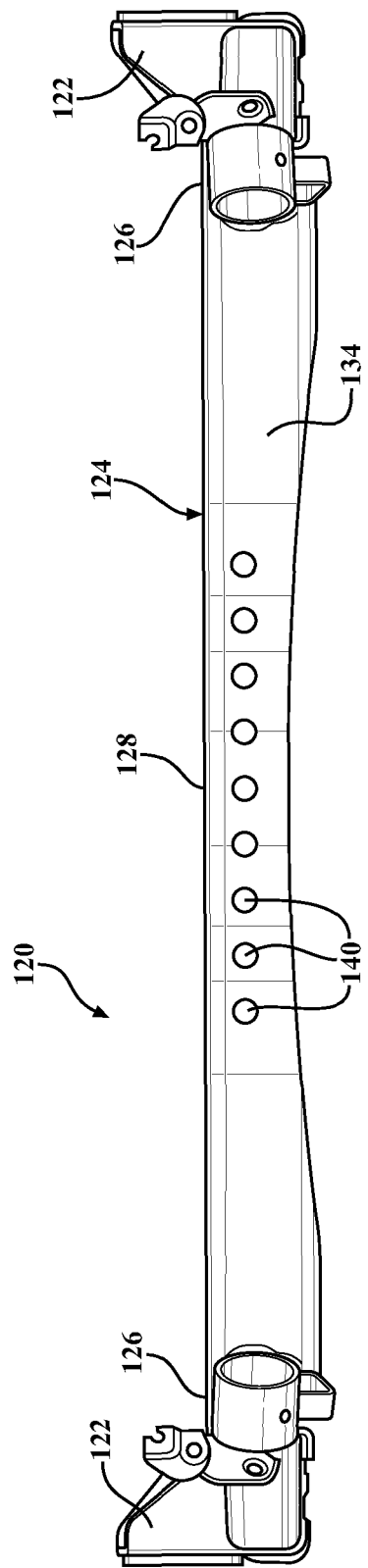
FIG. 9 is a front elevation view of the twist axle assembly of FIG. 7.
Figure 10:
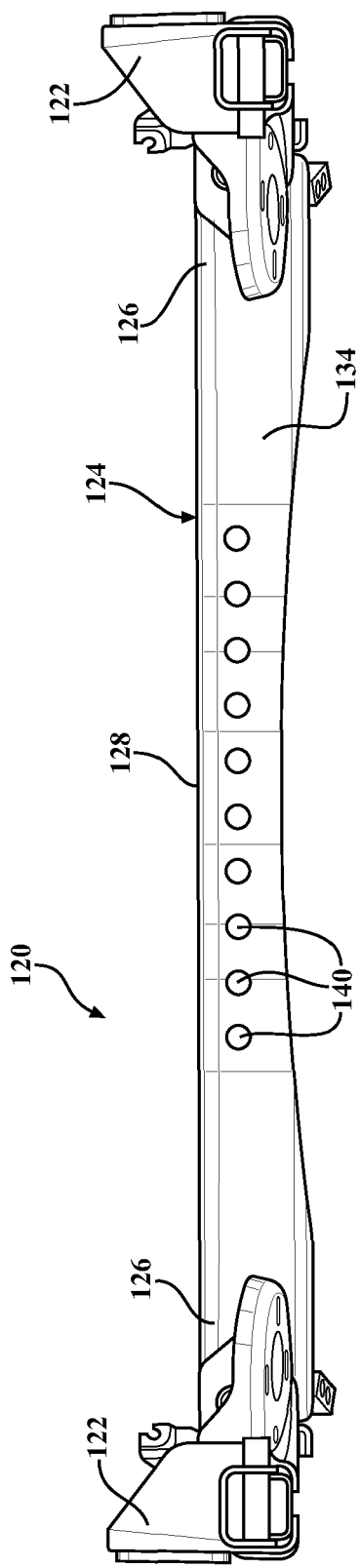
FIG. 10 is a back elevation view of the twist axle assembly of FIG. 7.

Additionally, as shown in FIGS. 9 and 10, the second exemplary embodiment of the twist beam 124 includes a plurality of apertures 140 formed therein. Specifically, the apertures 140 are located on the opposing side walls 134 in the middle portion 128 of the twist beam 124 and are substantially equally spaced from one another in the longitudinal direction. The apertures 140 function to further reduce the torsional stiffness of the middle portion 128 of the twist beam 124 without compromising the structural integrity of the twist beam 124.

Figure 11:
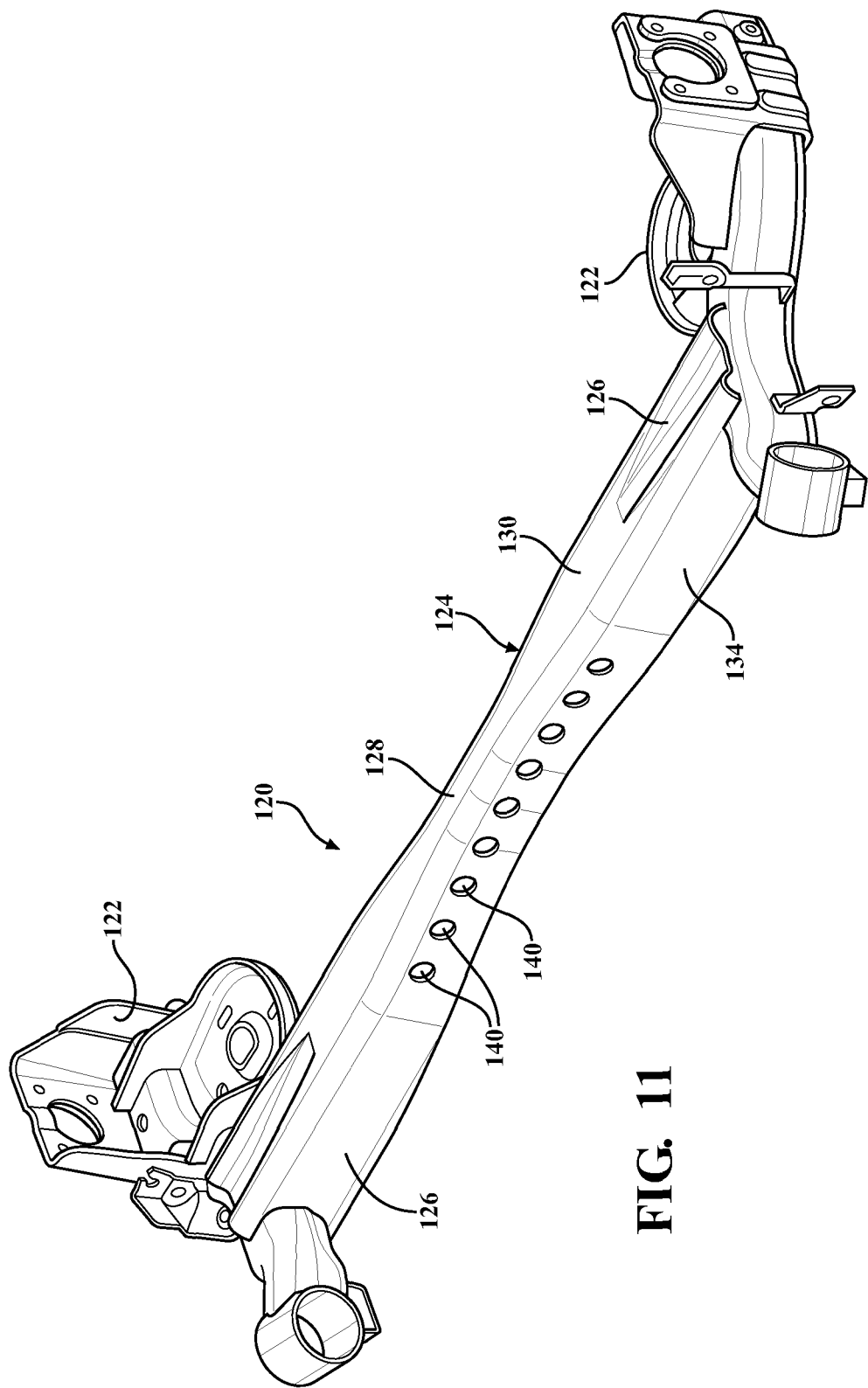
FIG. 11 is an perspective view of the twist axle assembly of FIG. 7.
Figure 12:
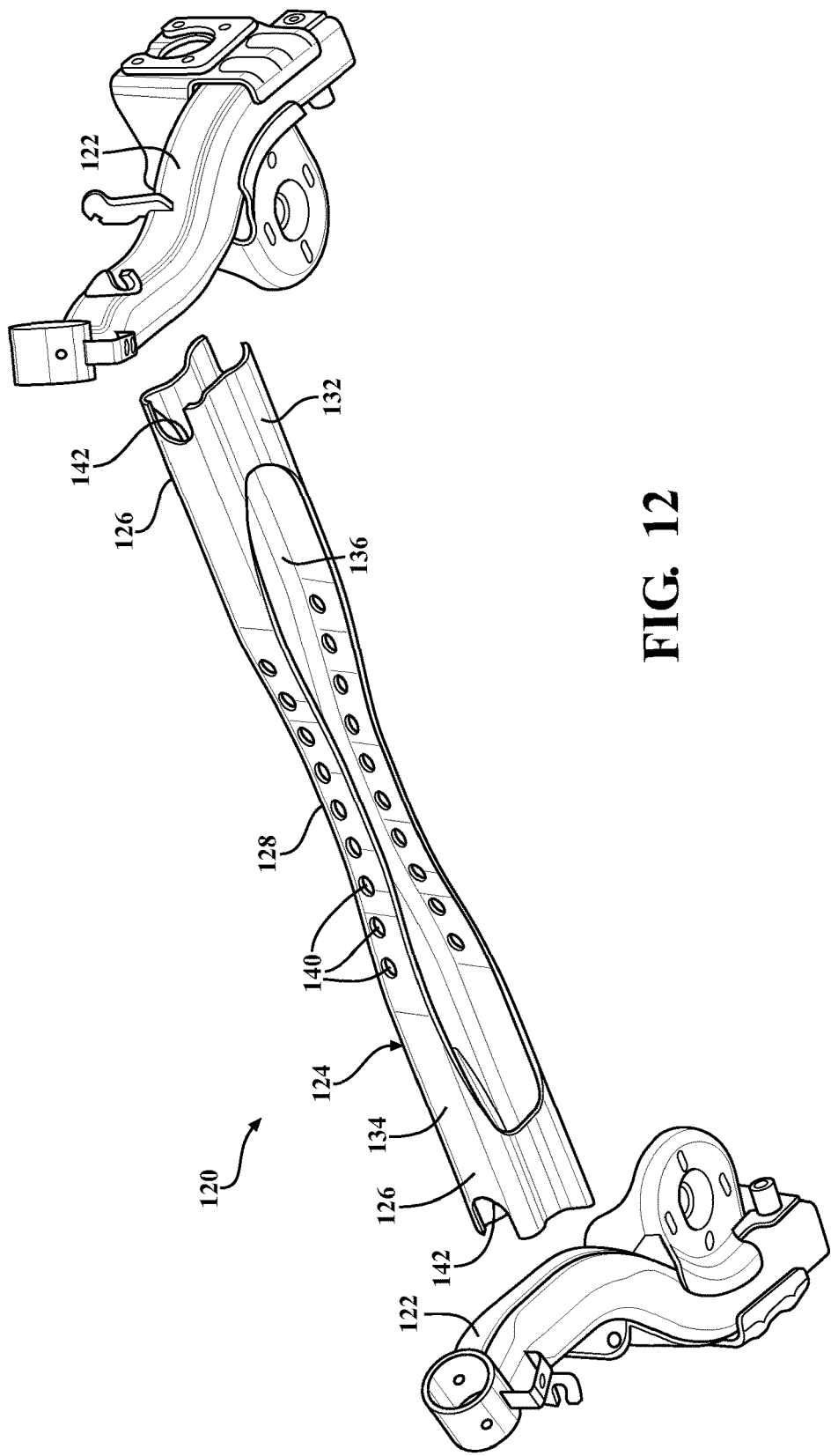
FIG. 12 is an exploded view of the twist axle assembly of FIG. 7.

Still further, as shown in FIG. 11, the longitudinal end portions 126 of the second exemplary embodiment of the twist beam 124 have U-shaped recesses 142 formed therein for allowing the twist beam 124 to directly engage with the trailing arms 122 in the glove-style connection without any intermediate brackets. The twist beam 124 may be interconnected with the trailing arms 122 through, for example, welding.

As with the first exemplary embodiment, the twist beam 124 of the second exemplary embodiment has an elliptical or oval shaped opening 136 formed into the bottom wall 132 thereof and extending at least partially into the lateral side walls 134 in the middle portion 128 of the twist beam 124 to provide the twist beam 124 with increased torsional stiffness in the end portions 126 and reduced torsional stiffness in the middle portion 128.

Figure 13:
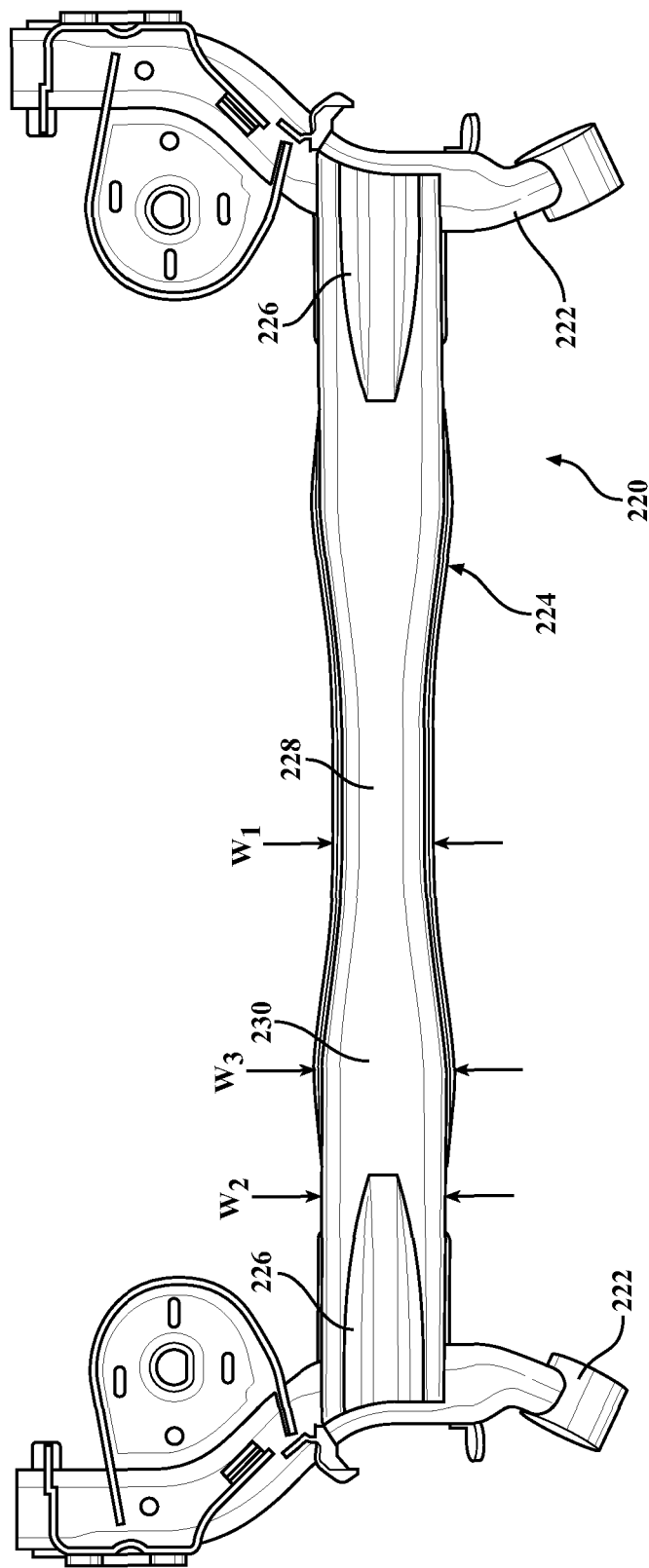
FIG. 13 is a top elevation view of a third exemplary embodiment of the twist axle assembly.
Figure 14:
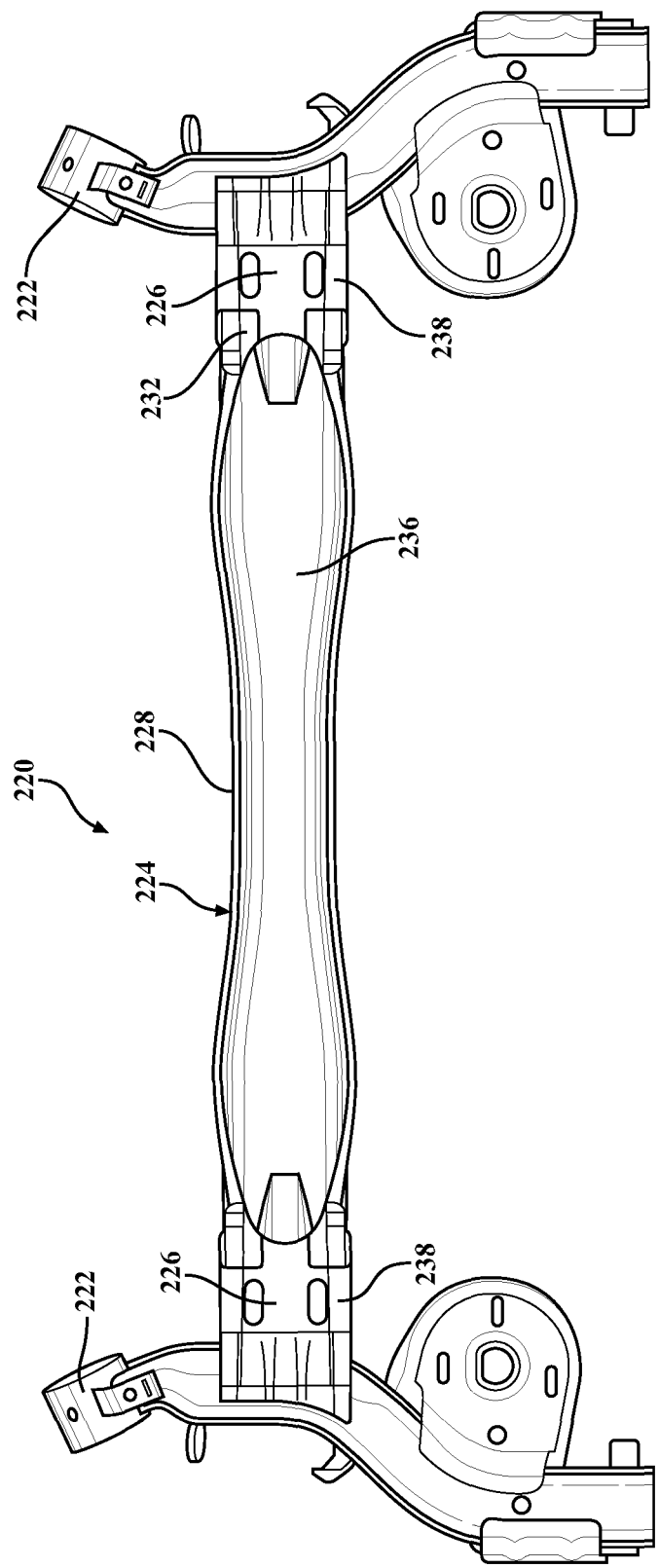
FIG. 14 is a bottom elevation view of the twist axle assembly of FIG. 13.
Figure 15:
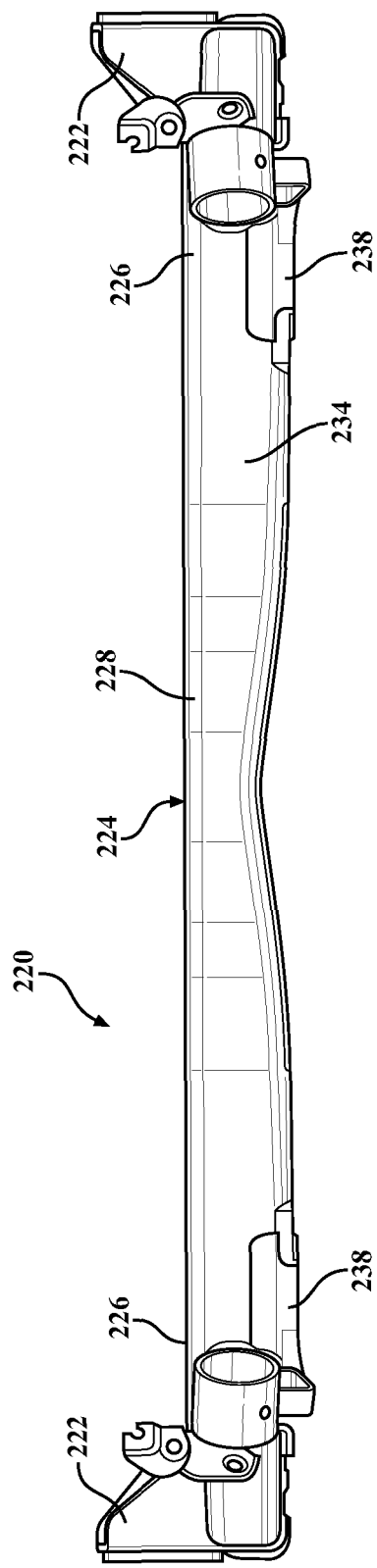
FIG. 15 is a front elevation view of the twist axle assembly of FIG. 13.
Figure 16:
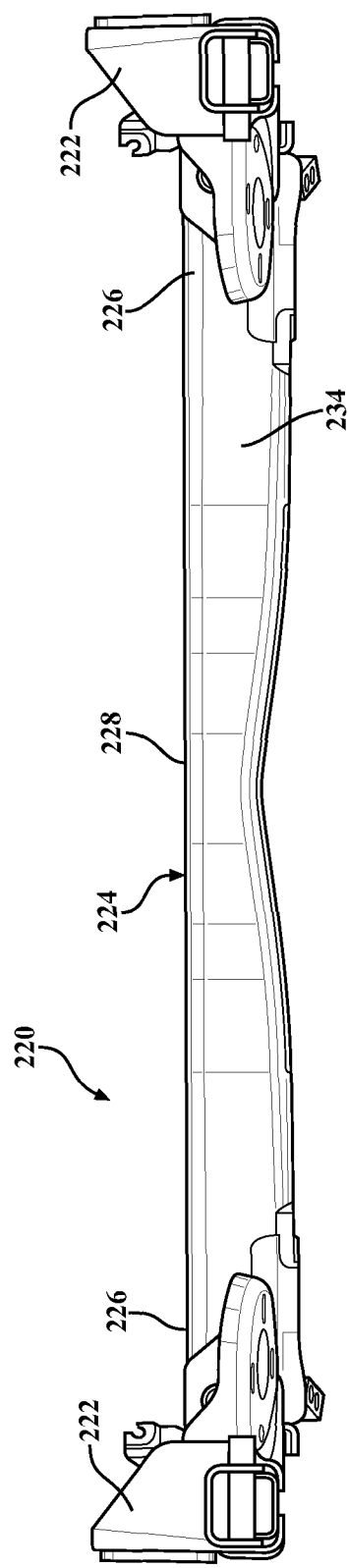
FIG. 16 is a back elevation view of the twist axle assembly of FIG. 13.
Figure 17:
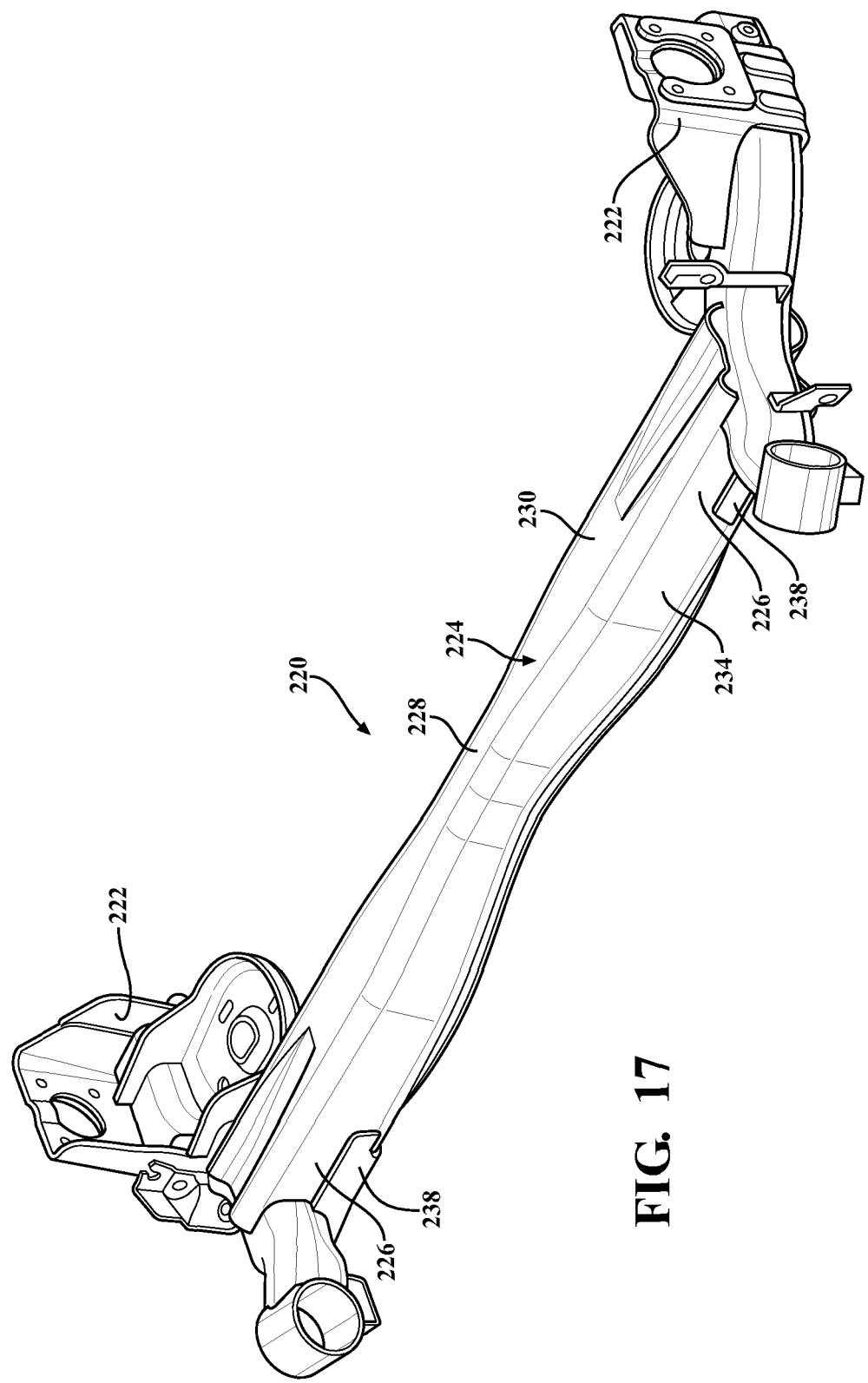
FIG. 17 is a perspective view of the twist axle assembly of FIG. 13.

Referring now to FIGS. 13-18, a third exemplary embodiment of the twist axle assembly 220 is generally shown with like numerals, separated by a factor of 200, indicate corresponding parts with the first exemplary embodiment described above. As shown in FIG. 13, the width of the twist beam 224 varies along the length of the twist beam 224. Specifically, the twist beam 224 has a first width $W_1$ at its longitudinal center and a greater second width $W_2$ at the end portions 226. The twist beam 224 also has a third width $W_3$, which is still greater than the second width $W_2$, in the middle portion 228 between the longitudinal center of the twist beam 224 and the end portions 226. This configuration provides the twist beam 224 with predetermined characteristics to vary the torsional stiffness along the longitudinal length thereof. That is, the increase in torsional stiffness from the midpoint of the twist beam 224 to the end portions 226 is not continuous.

The twist beam 224 of the third exemplary embodiment is also distinguished from the first and second exemplary embodiments by only including a single seat 244 (shown in FIG. 18) on each of the end portions 226 for directly engaging with the trailing arms 222. Each of the longitudinal ends is also configured to receive a single bracket 238 for engaging an opposite surface of the respective trailing arm 222 such that the twist beam 224 is engaged with the trailing arms 222 through glove style connections between the seats 244 and the brackets 238.

Figure 18:
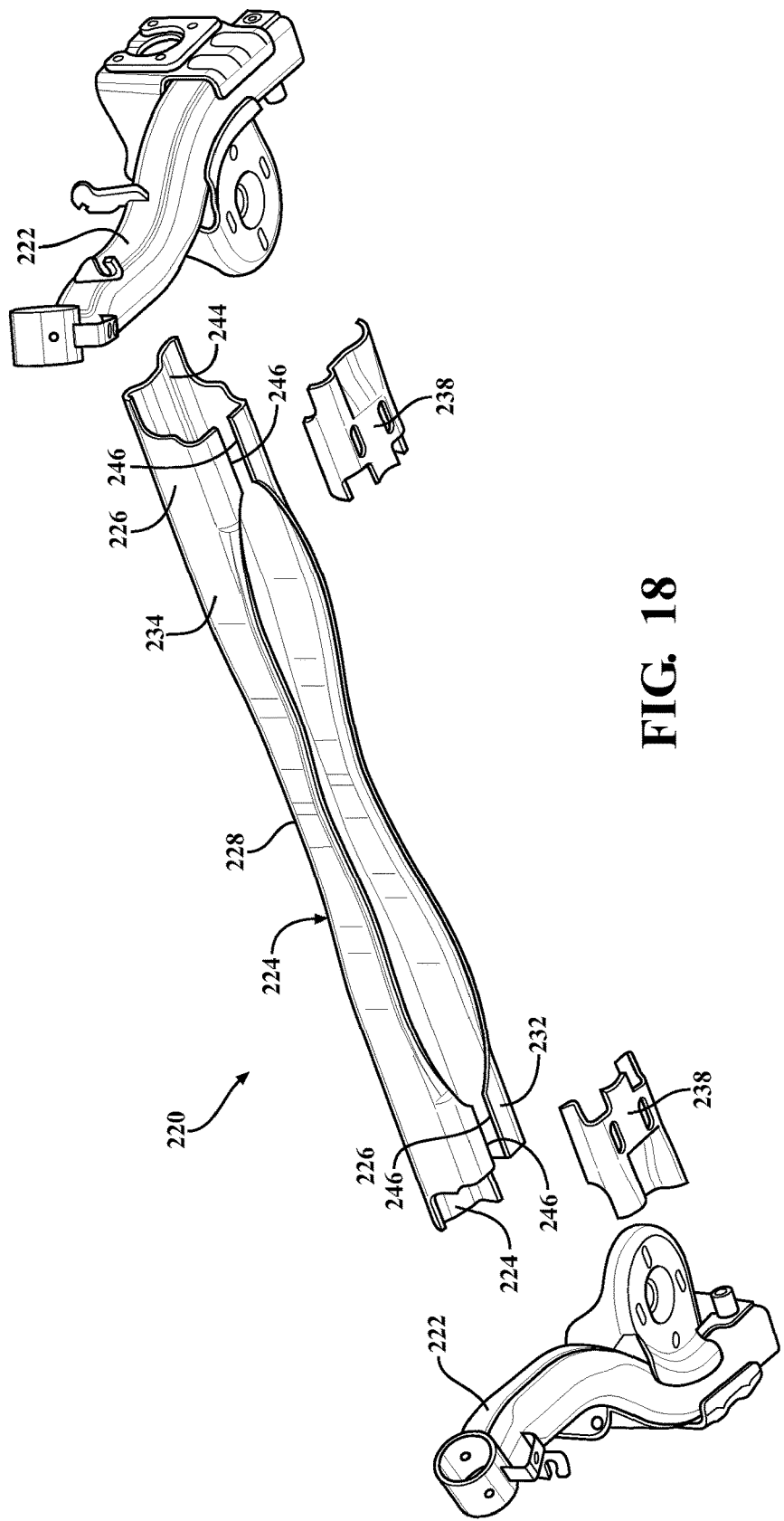
FIG. 18 is an exploded view of the twist axle assembly of FIG. 13.
Figure 20:
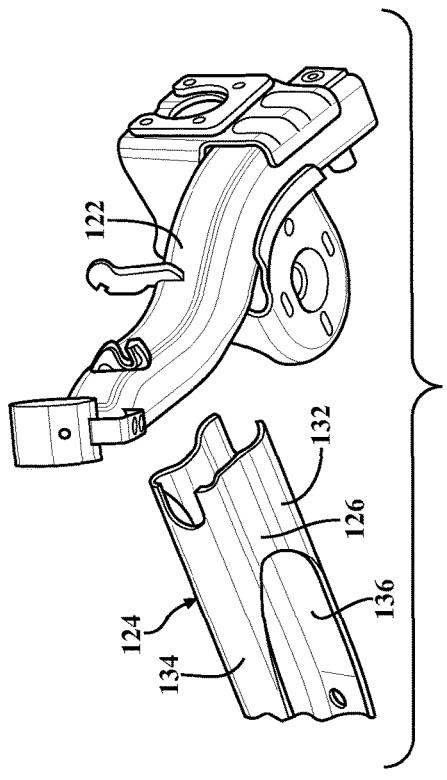
FIG. 20 is a fragmentary and exploded view of a portion of the twist axle assembly of FIG. 7.
Figure 21:
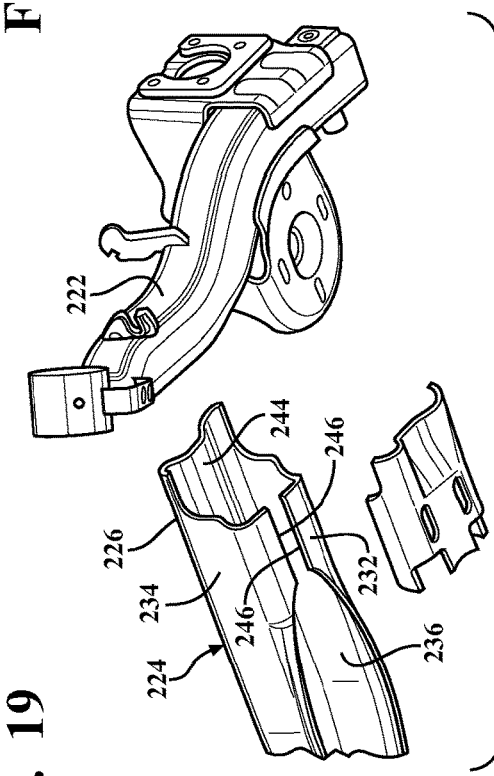
FIG. 21 is a fragmentary and exploded view of a portion of the twist axle assembly of FIG. 13.
Figure 19:
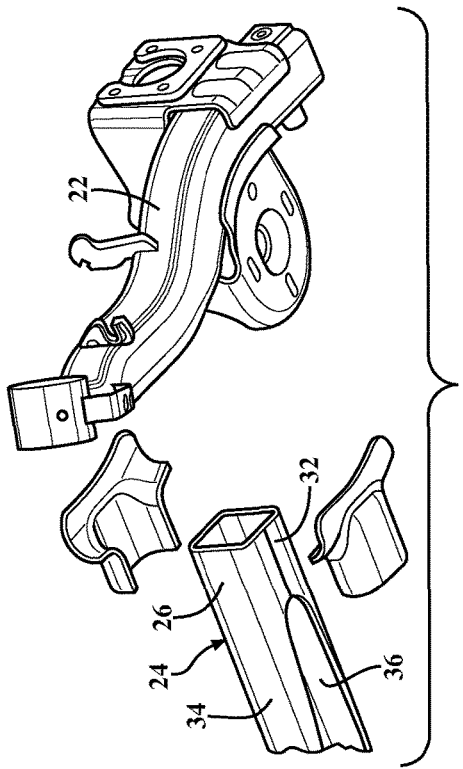
FIG. 19 is a fragmentary and exploded view of a portion of the twist axle assembly of FIG. 1.

Additionally, the twist beam 224 of the third exemplary embodiment is distinguished from the first and second exemplary embodiments described above by the end portions 226 being not fully enclosed in cross-section but instead being mostly enclosed. As shown in FIG. 18, the edges 246 of the twist beam 224 at the end sections face one another and are spaced slightly from one another by a gap, which has the effect of slightly reducing the torsional stiffness of the end portions 226 as compared to the first and second embodiments described above.

Another aspect of the present invention is a method of making a twist axle assembly 20, 120, 220. The method includes the step of providing a pair of trailing arms 22, 122, 222. The method proceeds with the step of stamping a workpiece into a twist beam 24, 124, 224. The twist beam 24, 124, 224 has a top wall 30, 130, 230, a bottom wall 32, 132, 232, a pair of side walls 34, 134, 234, a pair of end portions 26, 126, 226 and a middle portion 28, 128, 228 that extends between the end portions 26, 126, 226. The end portions 26, 126, 226 are bent to present edges that face one another when viewed in cross-section, and the middle portion 28, 128, 228 has an opening with a generally elliptical shape formed into the bottom wall 32, 132, 232 for reducing torsional stiffness in the middle portion 28, 128, 228 as compared to the end portions 26, 126, 226. The method proceeds with the step of attaching the end portions 26, 126, 226 of the twist beam 24, 124, 224 with the trailing arms 22, 122, 222.

Obviously, many modifications and variations of the present invention are possible in light of the above teachings and may be practiced otherwise than as specifically described while within the scope of the appended claims.

What is claimed is:

1. A twist axle assembly for a vehicle, comprising:
a pair of spaced apart trailing arms;
a twist beam of a single piece, operably connected with said trailing arms, and having a top wall and a bottom wall and a pair of side walls;
said twist beam being operably connected with said trailing arms via weld joints;
said twist beam presenting a pair of end portions which are bent to present edges that face towards one another when viewed in cross-section;
said twist beam presenting a middle portion which extends between said end portions and has an opening with a generally elliptical shape formed into said bottom wall for reducing a torsional stiffness of said middle portion of said twist beam in comparison to said end portions.

2. The twist axle assembly as set forth in claim 1 wherein said opening of said middle portion extends onto at least one of said side walls.

3. The twist axle assembly as set forth in claim 1 wherein said edges of said end portions contact one another.

4. The twist axle assembly as set forth in claim 1 wherein said edges of said end portions are spaced from one another by a gap.

5. A twist axle assembly for a vehicle, comprising:
a pair of spaced apart trailing arms;
a twist beam of a single piece, operably connected with said trailing arms, and having a top wall and a bottom wall and a pair of side walls;
said twist beam presenting a pair of end portions which are bent to present edges that face towards one another when viewed in cross-section;
said twist beam presenting a middle portion which extends between said end portions and has an opening with a generally elliptical shape formed into said bottom wall for reducing a torsional stiffness of said middle portion of said twist beam in comparison to said end portions; and
wherein a longitudinal midpoint of said twist beam has a first width and said end portions have a second width that is greater than said first width.

6. The twist axle assembly as set forth in claim 5 wherein said middle portion between said longitudinal midpoint of said twist beam and said end portions has a third width which is greater than said second width.

7. The twist axle assembly as set forth in claim 1 wherein said twist beam has a generally constant width between said end portions.

8. The twist axle assembly as set forth in claim 1 further including at least one bracket attaching each end portion of said twist beam with an associated one of said trailing arms.

9. The twist axle assembly as set forth in claim 1 wherein said end portions of said twist beam are directly welded to said trailing arms.

10. The twist axle assembly as set forth in claim 1 wherein said side walls of said middle portion are provided with openings to reduce the torsional stiffness of said middle portion.

11. A method of making a twist axle assembly, comprising the steps of:
   providing a pair of trailing arms;
   stamping a workpiece into a twist beam with a top wall, a bottom wall, and a pair of side walls and having a pair of end portions and a middle portion which extends between the end portions and wherein the end portions are bent to present edges that face one another when viewed in cross section and wherein the middle portion has an opening with a generally elliptical shape formed into the bottom wall for reducing torsional stiffness of the middle portion as compared to the end portions; and
   attaching the end portions of the twist beam with the trailing arms.

12. The method as set forth in claim 11 wherein the step of attaching the end portions of the twist beams with the trailing arms is further defined as welding the end portions of the twist beams to the trailing arms.

13. The method as set forth in claim 11 wherein the step of attaching the end portions of the twist beams with the trailing arms is further defined as welding brackets between the end portions of the twist beams and the trailing arms.

14. The method as set forth in claim 11 wherein the edges of the twist beam in the end sections contact one another such that each of the end sections has a closed geometric profile.

15. A method of making a twist axle assembly, comprising the steps of:
   providing a pair of trailing arms;
   stamping a workpiece into a twist beam with a top wall, a bottom wall, and a pair of side walls and having a pair of end portions and a middle portion which extends between the end portions and wherein the end portions are bent to present edges that face one another when viewed in cross section and wherein the middle portion has an opening with a generally elliptical shape formed into the bottom wall for reducing torsional stiffness of the middle portion as compared to the end portions;
   attaching the end portions of the twist beam with the trailing arms; and
   wherein the edges of the twist beam in the end sections are spaced from one another by a gap such that the end sections have open geometric profiles.

16. The method as set forth in claim 11 wherein the step of attaching the end portions of the twist beam with the trailing arms includes welding.

* * * * *